United States Patent
Minowa et al.

(10) Patent No.: US 9,232,164 B2
(45) Date of Patent: Jan. 5, 2016

(54) SOLID-STATE IMAGE SENSOR, CAMERA, AND METHOD OF DRIVING SOLID-STATE IMAGE SENSOR

(71) Applicant: CANON KABUSHIKI KAISHA, Tokyo (JP)

(72) Inventors: Masaaki Minowa, Kawasaki (JP); Akira Okita, Yamato (JP); Yu Arishima, Yokohama (JP); Masaaki Iwane, Sagamihara (JP); Kazuki Ohshitanai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/954,157

(22) Filed: Jul. 30, 2013

(65) Prior Publication Data

US 2014/0036121 A1 Feb. 6, 2014

(30) Foreign Application Priority Data

Jul. 31, 2012 (JP) .................................. 2012-170379

(51) Int. Cl.
*H04N 5/335* (2011.01)
*H04N 5/3745* (2011.01)
*H04N 5/378* (2011.01)

(52) U.S. Cl.
CPC ........... *H04N 5/37457* (2013.01); *H04N 5/378* (2013.01)

(58) Field of Classification Search
None
See application file for complete search history.

(56) References Cited

U.S. PATENT DOCUMENTS 6,693,670 B1 * 2/2004 Stark .................. H04N 5/343
348/241

| | | | |
|---|---|---|---|
| 7,768,561 B2 * | 8/2010 | Suzuki ........................ | 348/294 |
| 2004/0080645 A1 | 4/2004 | Shinohara ..................... | 348/301 |
| 2006/0044439 A1 * | 3/2006 | Hiyama et al. ............... | 348/308 |
| 2007/0235631 A1 * | 10/2007 | Ladd .......................... | 250/208.1 |
| 2009/0213237 A1 * | 8/2009 | Ishida ........................ | 348/221.1 |
| 2010/0053395 A1 * | 3/2010 | Motonaga ..................... | 348/300 |
| 2011/0181764 A1 | 7/2011 | Sambonsugi | |
| 2012/0194717 A1 * | 8/2012 | Iwata et al. .................. | 348/300 |

(Continued)

FOREIGN PATENT DOCUMENTS

JP 2004-134867 A 4/2004
WO 2013128581 A1 9/2013

OTHER PUBLICATIONS

Feb. 27, 2014 Intellectual Property Office (GB) Combined Search and Examination Report concerning GB Patent Application No. 1313617.1.

*Primary Examiner* — Twyler Haskins
*Assistant Examiner* — Wesley J Chiu
(74) *Attorney, Agent, or Firm* — Fitzpatrick, Cella, Harper & Scinto (57) ABSTRACT

An image sensor includes a pixel unit having first and second photoelectric converters, an amplifier provided commonly for the first and second photoelectric converters, first and second transfer transistors configured to respectively transfer charges generated in the first and second electric converters to an input portion of the amplifier. The signal read out by the readout portion includes a first optical signal read out in a state in which charges are transferred from the first photoelectric converter to the input portion by the first transfer transistor, and a second optical signal read out, after the readout of the first optical signal, in a state in which charges are transferred from the second photoelectric converter to the input portion by the second transfer transistor.

13 Claims, 6 Drawing Sheets

(56) References Cited

U.S. PATENT DOCUMENTS

| | | | |
|---|---|---|---|
| 2013/0050551 A1* | 2/2013 | Ichikawa | 348/300 |
| 2013/0087683 A1* | 4/2013 | Mo et al. | 250/208.1 |
| 2013/0222662 A1 | 8/2013 | Sakurai et al. | |
| 2014/0036121 A1 | 2/2014 | Minowa et al. | |

* cited by examiner

SOLID-STATE IMAGE SENSOR, CAMERA, AND METHOD OF DRIVING SOLID-STATE IMAGE SENSOR

BACKGROUND OF THE INVENTION

1. Field of the Invention

The present invention relates to a solid-state image sensor, a camera, and a method of driving a solid-state image sensor.

2. Description of the Related Art

Along with the recent requirement of a multiple pixel structure and high frame rate of a solid-state image sensor, a technique of shortening the time to read out a signal from a pixel is becoming increasingly important. Japanese Patent Laid-Open No. 2004-134867 describes a solid-state image sensor that provides one amplification element in correspondence with a plurality of photoelectric converters. One of the plurality of photoelectric converters will be referred to as a "first photoelectric converter", and another as a "second photoelectric converter" hereinafter for the descriptive convenience. The solid-state image sensor described in Japanese Patent Laid-Open No. 2004-134867 transfers the charges of the first photoelectric converter to the input portion of the amplification element and reads out a signal (to be referred to as a "first optical signal" hereinafter for the descriptive convenience). After that, the solid-state image sensor transfers the charges of the second photoelectric converter to the input portion and reads out a signal (to be referred to as a "second optical signal" hereinafter for the descriptive convenience) without resetting the input portion. In this case, the signal read out after the charges of the second photoelectric converter are transferred to the input portion is a signal corresponding to the sum of the charges of the first photoelectric converter and those of the second photoelectric converter.

In the method described in Japanese Patent Laid-Open No. 2004-134867, the second optical signal is larger than the first optical signal. Hence, the time needed for convergence of the second optical signal is longer than that needed for convergence of the first optical signal. If the time to read out the first optical signal and the time to read out the second optical signal are defined similarly, the times should be set such that the second optical signal can be read out at a sufficient accuracy. In this case, however, the time to read out the first optical signal is set longer than necessary. If the time to read out the first optical signal and the time to read out the second optical signal are defined similarly while giving priority to shortening the readout time, the readout accuracy of the second optical signal is lower than that of the first optical signal. Japanese Patent Laid-Open No. 2004-134867 does not describe these examinations and ideas about improvements based on them.

SUMMARY OF THE INVENTION

The present invention provides a technique advantageous in shortening the readout time and improving the readout accuracy.

The present invention in its first aspect provides a solid-state image sensor comprising a pixel unit, a readout portion configured to read out a signal from the pixel unit via a column signal line, and a holding portion configured to capture the signal read out by the readout portion, the pixel unit including a first photoelectric converter, a second photoelectric converter, an amplifier provided commonly for the first photoelectric converter and the second photoelectric converter to output a signal to the column signal line, a first transfer transistor configured to transfer charges generated in the first photoelectric converter to an input portion of the amplifier, and a second transfer transistor configured to transfer charges generated in the second photoelectric converter to the input portion, wherein the signal read out by the readout portion includes a first optical signal read out in a state in which charges are transferred from the first photoelectric converter to the input portion by the first transfer transistor, and a second optical signal read out, after the readout of the first optical signal, in a state in which charges are transferred from the second photoelectric converter to the input portion by the second transfer transistor, and letting T1 be a time from a start of readout of the first optical signal by the readout portion to an end of capturing of the first optical signal by the holding portion, and T2 be a time from a start of readout of the second optical signal by the readout portion to an end of capturing of the second optical signal by the holding portion, T1<T2 holds.

The present invention in its second aspect provides a camera comprising the solid-state image sensor as specified as the first aspect, and a processor configured to process a signal output from the solid-state image sensor.

The present invention in its third aspect provides a method of driving a solid-state image sensor including a pixel unit, a readout portion configured to read out a signal from the pixel unit via a column signal line, and a holding portion configured to capture the signal read out by the readout portion, the pixel unit including a first photoelectric converter, a second photoelectric converter, an amplifier provided commonly for the first photoelectric converter and the second photoelectric converter to output a signal to the column signal line, and a transfer transistor configured to transfer charges generated in the first photoelectric converter and the second photoelectric converter to an input portion of the amplifier, the signal read out by the readout portion including a first optical signal read out in a state in which charges are transferred from the first photoelectric converter to the input portion by the transfer transistor, and a second optical signal read out, after the readout of the first optical signal, in a state in which charges are transferred from the second photoelectric converter to the input portion by the transfer transistor, the method comprising: driving the solid-state image sensor such that letting T1 be a time from a start of readout of the first optical signal by the readout portion to an end of capturing of the first optical signal by the holding portion, and T2 be a time from a start of readout of the second optical signal by the readout portion to an end of capturing of the second optical signal by the holding portion, T1<T2 holds.

Further features of the present invention will become apparent from the following description of exemplary embodiments with reference to the attached drawings.

DESCRIPTION OF THE EMBODIMENTS

The embodiments of the present invention will now be described with reference to the accompanying drawings.

A solid-state image sensor IS1 according to the first embodiment of the present invention will be described with reference to FIGS. 1 and 2. The solid-state image sensor IS1 can include a plurality of pixel units 101, a plurality of readout portions 113, a plurality of holding portions 150, a horizontal scanning circuit 134, and an amplifier 133. The solid-state image sensor IS1 can also include a vertical scanning circuit (not shown).

Figure 1:
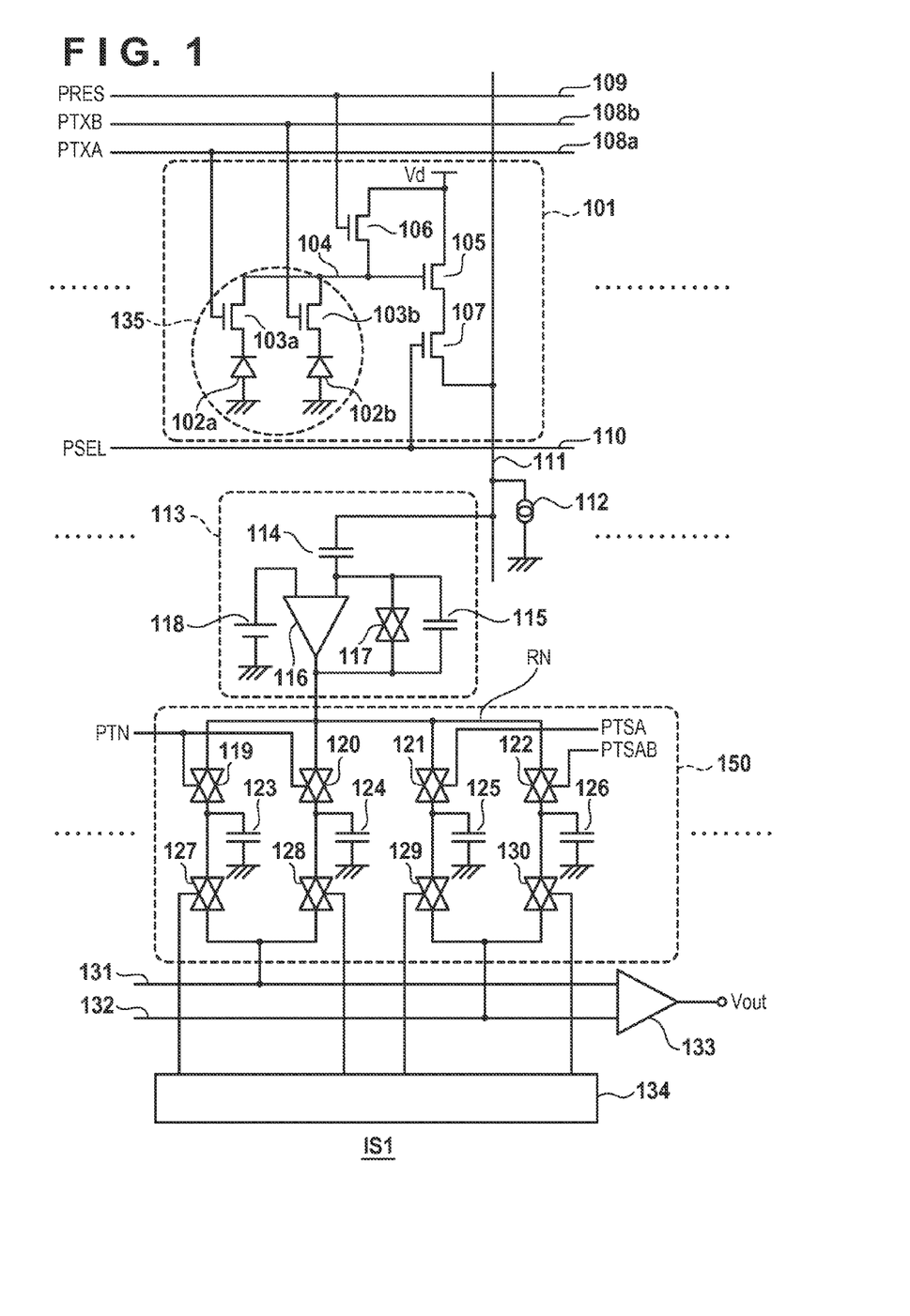
FIG. 1 is a circuit diagram showing the arrangement of a solid-state image sensor according to the first embodiment.

The plurality of pixel units 101 can be arranged to form a plurality of rows and a plurality of columns, and FIG. 1 illustrates only one pixel unit 101. Each pixel unit 101 includes a first photoelectric converter 102a and a second photoelectric converter 102b as a plurality of photoelectric converters. Each pixel unit 101 also includes an amplifier (amplification transistor) 105 commonly provided for the first photoelectric converter 102a and the second photoelectric converter 102b as the plurality of photoelectric converters. Each pixel unit 101 also includes a first transfer transistor 103a and a second transfer transistor 103b which respectively transfer charges generated in the first photoelectric converter 102a and the second photoelectric converter 102b to a floating diffusion serving as an input portion 104 of the amplifier 105. Each pixel unit 101 can also include a reset transistor 106 that resets the potential of the input portion 104 of the amplifier 105. Each pixel unit 101 can also include a selection transistor 107 that connects the pixel unit 101 to a column signal line 111. A state in which the pixel unit 101 is connected to the column signal line 111 is a state in which the pixel unit 101 is selected. A state in which the pixel unit 101 is not connected to the column signal line 111 is a state in which the pixel unit 101 is not selected.

Driving lines 108a, 108b, 109, and 110 to be driven by the above-described vertical scanning circuit (not shown) are connected to the gates of the first transfer transistor 103a, the second transfer transistor 103b, the reset transistor 106, and the selection transistor 107, respectively. In the first embodiment, a microlens 135 is commonly provided for the first photoelectric converter 102a and the second photoelectric converter 102b as the plurality of photoelectric converters of the pixel unit 101.

When light enters the first photoelectric converter 102a and the second photoelectric converter 102b, charges corresponding to the amount of the light are generated. The charges generated in the first photoelectric converter 102a and the second photoelectric converter 102b are transferred to the input portion 104 by the first transfer transistor 103a and the second transfer transistor 103b, respectively. The potential of the input portion 104 changes in accordance with the transfer of charges from the first photoelectric converter 102a and the second photoelectric converter 102b. The amplifier 105 outputs a signal corresponding to the potential of the input portion 104 to the column signal line 111. The amplifier 105 and a constant current source 112 connected to the column signal line 111 can form a source follower.

The readout portion (column amplifier) 113 reads out, to a readout node RN, the signal output from the pixel unit 101 to the column signal line 111. The readout portion 113 can include, for example, a differential amplifier (OP amplifier) 116, a clamp capacitor 114, a feedback capacitor 115, and a switch 117. The differential amplifier 116 includes a first input terminal, a second input terminal, and an output terminal. The feedback capacitor 115 and the switch 117 are arranged in parallel between the first input terminal of the differential amplifier 116 and the output terminal of the differential amplifier 116. The clamp capacitor 114 is arranged between the first input terminal of the differential amplifier 116 and the input terminal of the readout portion 113. A reference voltage is applied from a reference voltage source 118 to the second input terminal of the differential amplifier 116. The output terminal of the differential amplifier 116 is connected to the readout node RN.

The holding portion 150 captures the signal read out to the readout node RN by the readout portion 113. The holding portion 150 includes memories 123, 124, 125, and 126, switches 119, 120, 121, and 122, and switches 127, 128, 129, and 130. Each of the memories 123, 124, 125, and 126 can be formed from, for example, a capacitor. The switches 119, 120, 121, and 122 are arranged between the readout node RN and the memories 123, 124, 125, and 126, respectively. The switches 127 and 128 are arranged between a horizontal signal line 131 and the memories 123 and 124, respectively. The switches 129 and 130 are arranged between a horizontal signal line 132 and the memories 125 and 126, respectively.

The amplifier 133 is a differential amplifier. The horizontal signal lines 131 and 132 are connected to the input terminals of the amplifier 133. The switches 127, 128, 129, and 130 of the holding portion 150 are controlled by the horizontal scanning circuit 134.

The operation (driving method) of the solid-state image sensor IS1 according to the first embodiment shown in FIG. 1 will be described below with reference to FIG. 2. PTXA, PTXB, PRES, and PSEL in FIG. 2 are signals to be applied to the driving lines 108a, 108b, 109, and 110, respectively. The first transfer transistor 103a, the second transfer transistor 103b, the reset transistor 106, and the selection transistor 107 are turned on respectively w when the signals PTXA, PTXB, PRES, and PSEL change to high level. PC0R is a signal that controls the switch 117 of the readout portion (column amplifier) 113. When the signal PC0R changes to high level, the switch 117 is turned on. PH is a clock signal to drive the horizontal scanning circuit 134.

At time T201, charges are accumulated in the first photoelectric converter 102a and the second photoelectric converter 102b. At the time T201, the first transfer transistor 103a and the second transfer transistor 103b are off, the reset transistor 106 is on, and the input portion 104 of the amplifier 105 is reset to the reset potential. In addition, at the time T201, the selection transistor 107 is off, and the pixel unit 101 is in the unselected state. Furthermore, at the time T201, the switch 117 of the readout portion 113 is on, and the readout portion 113 operates as a unity gain buffer. When the voltage applied from the reference voltage source 118 to the second input terminal of the differential amplifier 116 is the reference voltage VC0R, the voltage of the first input terminal, second input terminal, and output terminal of the differential amplifier 116 is VC0R. Additionally, at the time T201, the switches 119 to 122 and 127 to 130 are off.

At time T202, PSEL changes to high level to turn on the selection transistor 107. The pixel unit 101 and the column signal line 111 are thus connected, and the amplifier 105 and the constant current source 112 form a source follower.

At time T203, PRES changes to low level to turn off the reset transistor 106. Hence, the input portion 104 of the amplifier 105 changes to a floating state.

During the period from time T204 to T205, PTN, PTSA, and PTSAB change to high level to turn on the switches 119 to 122. The signal (VC0R) output from the readout portion 113 to the readout node RN is thus received and held by the memories 123 to 126 of the holding portion 150. In other words, the signal (VC0R) output from the readout portion 113 to the readout node RN is thus captured by the holding portion 150

At time T206, PC0R changes to low level to turn off the switch 117 of the readout portion 113. The readout portion 113 is released from unity gain buffer state and operates as an inverting amplifier having a gain (−C0/Cf), where C0 is the value of the clamp capacitor 114, and Cf is the value of the feedback capacitor 115.

During the period from time T207 to T208, PTN changes to high level to turn on the switches 119 and 120. The memories 123 and 124 thus receive the signal (noise signal) output from the readout portion 113 to the readout node RN to hold it in the state in which the charges of the first photoelectric converter 102a and the second photoelectric converter 102b are not transferred to the input portion 104.

During the period from time T209 to T210, PTXA changes to high level to turn on the first transfer transistor 103a. Hence, the charges generated in the first photoelectric converter 102a are transferred to the input portion 104 of the amplifier 105. The amplifier 105 outputs a signal according to the change in the potential of the input portion 104 caused by the charge transfer to the column signal line 111. The readout portion 113 starts the operation of amplifying the signal output to the column signal line 111 by the gain (−C0/Cf) and outputting the signal (first optical signal) to the readout node RN.

During the period from time T211 to T212, PTSA changes to high level to turn on the switch 121 of the holding portion 150. The memory 125 thus receives the first optical signal corresponding to the charges generated in the first photoelectric converter 102a to hold it. FIG. 2 shows an example in which PTSA rises at the time T211. However, PTSA may rise at an arbitrary time during the period from the time T208 to T209.

During the period from time T213 to T214, PTXA and PTXB change to high level to turn on both the first transfer transistor 103a and the second transfer transistor 103b. Hence, charges generated in the first photoelectric converter 102a after the time T210 and charges generated in the second photoelectric converter 102b after PTXB has finally changed from high level to low level are transferred to the input portion 104 of the amplifier 105. The amplifier 105 outputs a signal according to the change in the potential of the input portion 104 caused by the charge transfer to the column signal line 111. The readout portion 113 starts the operation of amplifying the signal output to the column signal line 111 by the gain (−C0/Cf) and outputting the signal (second optical signal) to the readout node RN. Note that if the charge accumulation period of the first photoelectric converter 102a and that of the second photoelectric converter 102b can temporally be shifted, only PTXB out of PTXA and PTXB may be changed to high level during the period from the time T213 to T214.

During the period from time T215 to T216, PTSAB changes to high level to turn on the switch 122 of the holding portion 150. The memory 126 thus receives the signal (second optical signal) corresponding to the sum of the charges generated in the first photoelectric converter 102a and the second photoelectric converter 102b to hold it. FIG. 2 shows an example in which PTSAB rises at the time T215. However, PTSAB may rise at an arbitrary time during the period from the time T212 to T213.

At time T217, the PRES changes to high level to turn on the reset transistor 106. Hence, the input portion 104 of the amplifier 105 is reset to the reset potential. In addition, at the time T217, PC0R also changes to high level to turn on the switch 117 of the readout portion 113, and the readout portion 113 is thus set in the unity gain buffer state.

At time T218, PSEL changes to low level to turn off the selection transistor 107, and selection of the selected pixel unit 101 is stopped. At time T219, the horizontal scanning circuit 134 starts the operation. Although not illustrated in FIG. 2, the horizontal scanning circuit 134 turns on the switches 127 and 129 of the holding portion 150 to transfer the signals held by the memories 123 and 125 to the horizontal signal lines 131 and 132. The amplifier 133 differentially amplifies the signals output to the horizontal signal lines 131 and 132 and outputs them. With this differential amplification, the output offset of the readout portion 113 and noise commonly included in the horizontal signal lines 131 and 132 are canceled. After the horizontal signal lines 131 and 132 are reset, the horizontal scanning circuit 134 turns on the switches 128 and 130 to transfer the signals held by the memories 124 and 126 to the horizontal signal lines 131 and 132. The amplifier 133 differentially amplifies the signals output to the horizontal signal lines 131 and 132 and outputs them. The above-described operation is executed for each row of the pixel units 101.

Let T1 be the time from the start of readout of the first optical signal by the readout portion 113 to the end of capturing of the first optical signal by the holding portion 150, and T2 be the time from the start of readout of the second optical signal by the readout portion 113 to the end of capturing of the second optical signal by the holding portion 150. In this case, T1<T2 holds preferably. The first optical signal is a signal corresponding to the amount of charges generated in the first photoelectric converter 102a. More specifically, the first optical signal is a signal read out by the readout portion 113 to the readout node RN in a state in which the charges generated in the first photoelectric converter 102a are transferred to the input portion 104. The second optical signal is a signal corresponding to the amount of charges generated in the first photoelectric converter 102a and the second photoelectric converter 102b. More specifically, the second optical signal is a signal read out by the readout portion 113 to the readout node RN in a state in which the charges generated in the first photoelectric converter 102a and the second photoelectric converter 102b are transferred to the input portion 104.

Also let T0 be the time from the start of readout of the noise signal by the readout portion 113 to the end of capturing of the noise signal by the holding portion 150. In this case, T0<T1<T2 holds preferably. The noise signal is a signal corresponding to the potential of the input portion 104 in a state in which the reset of the input portion 104 by the reset transistor 106 is canceled. More specifically, the noise signal is a signal read out by the readout portion 113 to the readout node RN in a state in which the reset of the input portion 104 by the reset transistor 106 is canceled.

The time T1 from the start of readout of the first optical signal by the readout portion 113 to the end of capturing of the first optical signal by the holding portion 150 is the time from the time T209 to the time T212. The time T209 is the time at which charge transfer from the first photoelectric converter 102a to the input portion 104 starts. The readout portion 113 starts reading out the first optical signal at the time T209. The time T2 from the start of readout of the second optical signal by the readout portion 113 to the end of capturing of the second optical signal by the holding portion 150 is the time from the time T213 to the time T216. The time T213 is the time at which charge transfer from the second photoelectric converter 102b to the input portion 104 starts. The readout portion 113 starts reading out the second optical signal at the time T213 (before the time T213, the readout portion 113 only reads out the first optical signal). The time T0 from the start of readout of the noise signal by the readout portion 113 to the end of capturing of the noise signal by the holding portion 150 is the time from the time T206 to the time T208. The time T206 is the time at which PC0R changes to low level, and the readout portion 113 starts amplification by the gain (−C0/Cf).

The reason why the driving method meeting T1<T2 or T0<T1<T2 as described above is preferable will specifically be described. The time from the start of operation of an amplifier such as the readout portion 113 to the convergence of the output is called a settling time. At the time T208, T212, or T216 at which capturing of the signal ends, the value of the output signal of the readout portion 113 needs to converge in an allowable range. When a small signal is input to the readout portion 113, a change $\Delta$Vout in the output signal (output voltage) of the readout portion 113 is proportional to a change $\Delta$Vin in the input voltage and can be given by $$\Delta Vout = -\Delta Vin \cdot C0/Cf \cdot (1 - \exp(-t/\tau)) \quad (1)$$

where $\tau$ is a time constant determined by the characteristic of the transistor that forms the differential amplifier 116 of the readout portion 113, the current supplied to the differential amplifier 116, and the load connected to the output terminal of the differential amplifier 116, and t is a time. When a large signal is input to the readout portion 113, the output signal (output voltage) of the readout portion 113 increases in accordance with the slew rate of the differential amplifier 116 independently of the input voltage, and the change $\Delta$Vout in the output voltage can be given by $$\Delta Vout = Iss/Cout \cdot t \quad (2)$$

where Iss is the output current of the differential amplifier 116, and Cout is the capacitor connected to the output terminal of the differential amplifier 116. When the change in the output is fed back to the input, and the voltage across the two input terminals of the differential amplifier 116 lowers, the output voltage starts changing in accordance with equation (1). For this reason, according to equation (2), when the output voltage lowers by $\Delta$V, the settling time of the readout portion 113 shortens by $$t = \Delta V \cdot Cout/Iss$$

According to equation (1), the time needed until the output signal of the readout portion 113 converges into a predetermined error range $\epsilon$ is given by $$t = -\tau \cdot \ln(\epsilon/\Delta Vout(t \to \infty))$$

where $\Delta Vout(t \to \infty)$ is the voltage to which $\Delta$Vout converges. As can be seen from this equation, the lower the output voltage is, the shorter the settling time of the readout portion 113 is.

In the above-described readout method, the second optical signal is the sum of the first optical signal and the signal corresponding to the amount of charges generated in the second photoelectric converter 102b. Hence, the value of the second optical signal is always larger than that of the first optical signal. The settling time of the output signal of the readout portion 113 upon reading out the first optical signal is shorter than the settling time of the output signal of the readout portion 113 upon reading out the second optical signal. Hence, the solid-state image sensor IS1 is preferably operated so as to meet T1<T2. In addition, since the noise signal is smaller than the first optical signal and the second optical signal, the solid-state image sensor IS1 is preferably operated so as to meet T0<T1<T2. This is advantageous in improving the readout accuracy while shortening the readout time.

In the solid-state image sensor IS1 shown in FIG. 1, the microlens 135 commonly to the first photoelectric converter 102a and the second photoelectric converter 102b is provided. The solid-state image sensor IS1 having this arrangement is applicable to phase difference focus detection. When the microlens 135 common to the first photoelectric converter 102a and the second photoelectric converter 102b is provided, a light beam that has passed through the first region of a pupil can be made to enter the first photoelectric converter 102a, and a light beam that has passed through the second region of the pupil can be made to enter the second photoelectric converter 102b. An image formed by the light beam passed through the first region of the pupil is defined as an image A, and an image formed by the light beam passed through the second region of the pupil is defined as an image B. In this case, the signal read out from the first photoelectric converter 102a is the signal of the image A, and the signal read out from the second photoelectric converter 102b is the signal of the image B.

The above-described first optical signal corresponds to the signal of the image A, and the above-described second optical signal corresponds to the sum of the signal of the image A and the signal of the image B. Hence, the signal of the image B can be obtained by subtracting the first optical signal from the second optical signal. Focus detection can be performed based on the signal of the image A and the signal of the image B obtained in this way. The second optical signal can also be used as an image signal.

A sensed image is required to have low noise. The sum of the signal of the image A and the signal of the image B, that is, the second optical signal is required to have a high S/N ratio. However, the first optical signal (the signal of the image A) that is the signal for focus detection need only have an accuracy capable of focus detection and is not required to have a high S/N ratio. Hence, when the S/N ratio of the first optical signal is traded off for a shorter readout time of the first optical signal, the operation can be speeded up without degrading image information.

Figure 3:
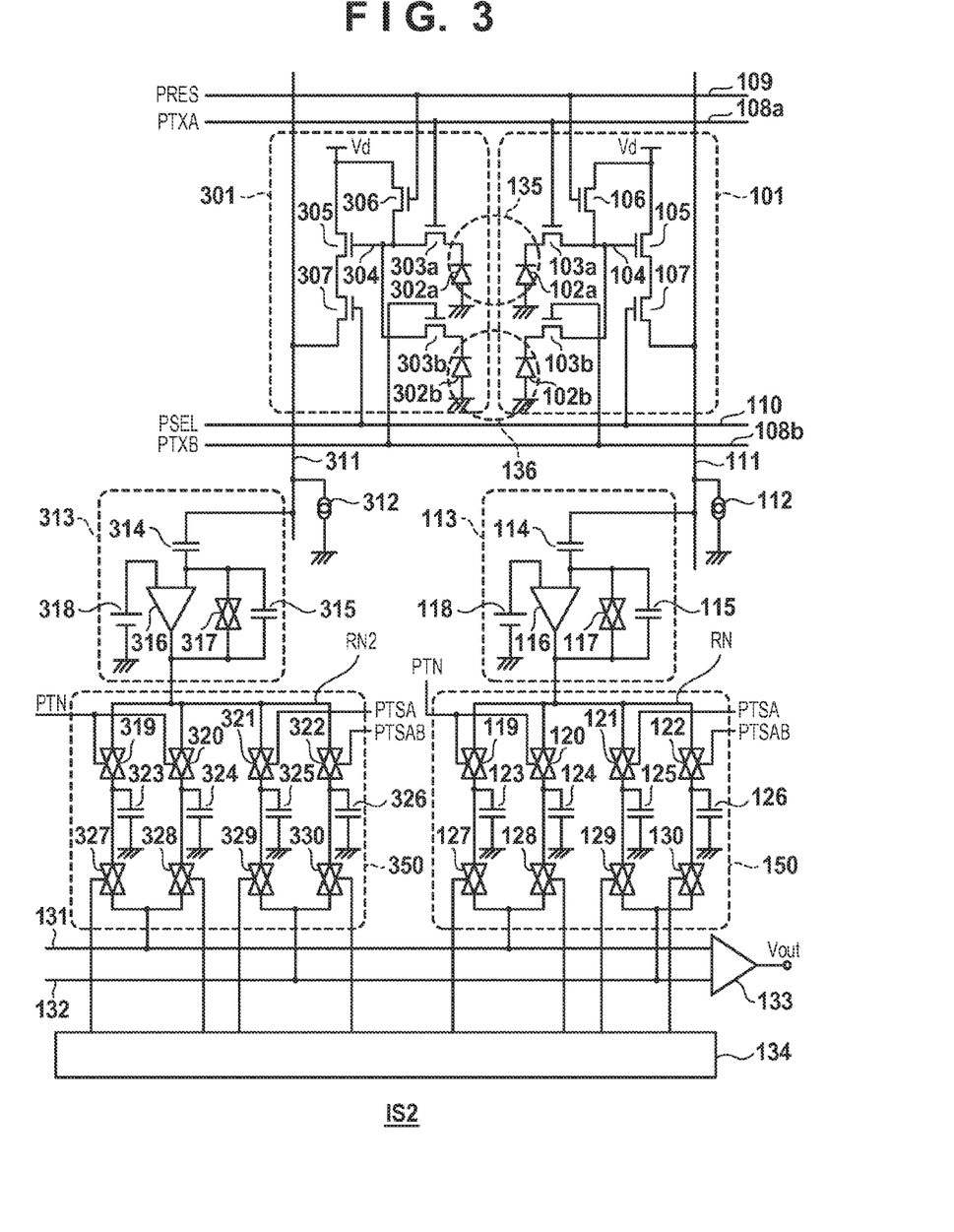
FIG. 3 is a circuit diagram showing the arrangement of a solid-state image sensor according to the second embodiment.

A solid-state image sensor IS2 according to the second embodiment of the present invention will be described with reference to FIG. 3. Note that the same reference numerals as in the solid-state image sensor IS1 of the first embodiment shown in FIG. 1 denote the same elements. Points not mentioned in the second embodiment can comply with the first embodiment. In the solid-state image sensor IS2 according to the second embodiment, a microlens is commonly provided for a photoelectric converter of a first pixel unit 101 and a photoelectric converter of a second pixel unit 301.

The solid-state image sensor IS2 of the second embodiment has an arrangement in which units each including the first pixel unit 101 and the second pixel unit 301 are arranged in a matrix. Note that FIG. 3 illustrates only one unit for the sake of simplicity. The solid-state image sensor IS2 of the second embodiment can include a plurality of readout portions 113 and 313, a plurality of holding portions 150 and 350, a horizontal scanning circuit 134, and an amplifier 133. The solid-state image sensor IS2 can also include a vertical scanning circuit (not shown).

The first pixel unit 101 has the same arrangement as that of the pixel unit 101 of the first embodiment. The second pixel unit 301 includes the same elements as those of the first pixel unit 101. The arrangement of the elements of the second pixel unit 301 and that of the elements of the first pixel unit 101 can have mirror symmetry. The second pixel unit 301 includes a third photoelectric converter 302a and a fourth photoelectric converter 302b as a plurality of photoelectric converters. Each pixel unit 301 also includes a second amplifier 305 commonly provided for the third photoelectric converter 302a and the fourth photoelectric converter 302b as the plurality of photoelectric converters. Each pixel unit 301 also includes a third transfer transistor 303a and a fourth transfer transistor 303b which respectively transfer charges generated in the third photoelectric converter 302a and the fourth photoelectric converter 302b to an input portion (second input portion) 304 of the second amplifier 305. Each pixel unit 301 can also include a reset transistor 306 that resets the potential of the input portion 304 of the second amplifier 305. Each pixel unit 301 can also include a selection transistor 307 that connects the pixel unit 301 to a column signal line 311.

A microlens 135 is commonly provided for a first photoelectric converter 102a of the first pixel unit 101 and the third photoelectric converter 302a of the second pixel unit 301. A microlens 136 is commonly provided for a second photoelectric converter 102b of the first pixel unit 101 and the fourth photoelectric converter 302b of the second pixel unit 301.

The readout portion 113 has the same arrangement as the readout portion 113 of the first embodiment and reads out, to a readout node RN, the signal output from the pixel unit 101 to a column signal line 111. The readout portion (second readout portion) 313 has the same arrangement as the readout portion 113 and reads out, to a readout node RN2, the signal output from the pixel unit 301 to the column signal line 311. The readout portion 313 can include, for example, a differential amplifier (OP amplifier) 316, a clamp capacitor 314, a feedback capacitor 315, and a switch 317. The differential amplifier 316 includes a first input terminal, a second input terminal, and an output terminal. The feedback capacitor 315 and the switch 317 are arranged in parallel between the first input terminal of the differential amplifier 316 and the output terminal of the differential amplifier 316. The clamp capacitor 314 is arranged between the first input terminal of the differential amplifier 316 and the input terminal of the readout portion 313. A reference voltage is applied from a reference voltage source 318 to the second input terminal of the differential amplifier 316. The output terminal of the differential amplifier 316 is connected to the readout node RN2.

The holding portion (second holding portion) 350 holds the signal read out to the readout node RN2 by the readout portion 313. The holding portion 350 includes memories 323, 324, 325, and 326, switches 319, 320, 321, and 322, and switches 327, 328, 329, and 330. Each of the memories 323, 324, 325, and 326 can be formed from, for example, a capacitor. The switches 319, 320, 321, and 322 are arranged between the readout node RN2 and the memories 323, 324, 325, and 326, respectively. The switches 327 and 328 are arranged between a horizontal signal line 131 and the memories 323 and 324, respectively. The switches 329 and 330 are arranged between a horizontal signal line 132 and the memories 325 and 326, respectively.

Figure 2:
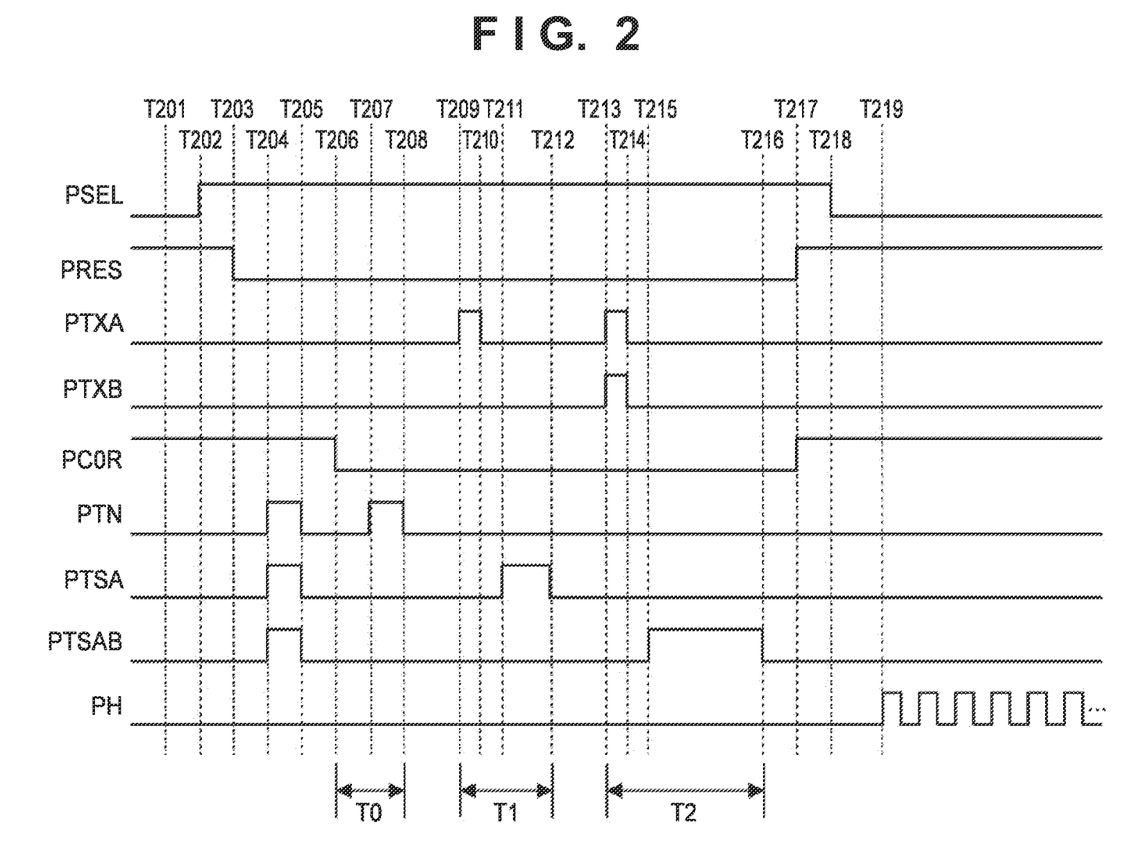
FIG. 2 is a timing chart showing the operation of solid-state image sensors according to the first to third embodiments.

The solid-state image sensor IS2 of the second embodiment operates as shown in the timing chart of FIG. 2, like the solid-state image sensor IS1 of the first embodiment. Let T1 be the time from the start of readout of the first optical signal by the readout portions 113 and 313 to the end of capturing of the first optical signal by the holding portions 150 and 350, and T2 be the time from the start of readout of the second optical signal by the readout portions 113 and 313 to the end of capturing of the second optical signal by the holding portions 150 and 350. In this case, T1<T2 holds preferably. Also let T0 be the time from the start of readout of the noise signal by the readout portions 113 and 313 to the end of capturing of the noise signal by the holding portions 150 and 350. In this case, T0<T1<T2 holds preferably.

In the solid-state image sensor IS1 according to the first embodiment, the timings of signal readout from the first photoelectric converter 102a and the second photoelectric converter 102b arranged under the common microlens 135 are slightly different. On the other hand, in the solid-state image sensor IS2 according to the second embodiment, the timings of signal readout from the first photoelectric converter 102a and the third photoelectric converter 302a arranged under the common microlens 135 are the same. Similarly, in the solid-state image sensor IS2 according to the second embodiment, the timings of signal readout from the second photoelectric converter 102b and the fourth photoelectric converter 302b arranged under the common microlens 136 are the same. Hence, in the second embodiment, no error occurs due to the difference between the timings of signal readout from the two photoelectric converters arranged under the common microlens and, for example, the accuracy of phase difference focus detection can be improved.

Figure 4:
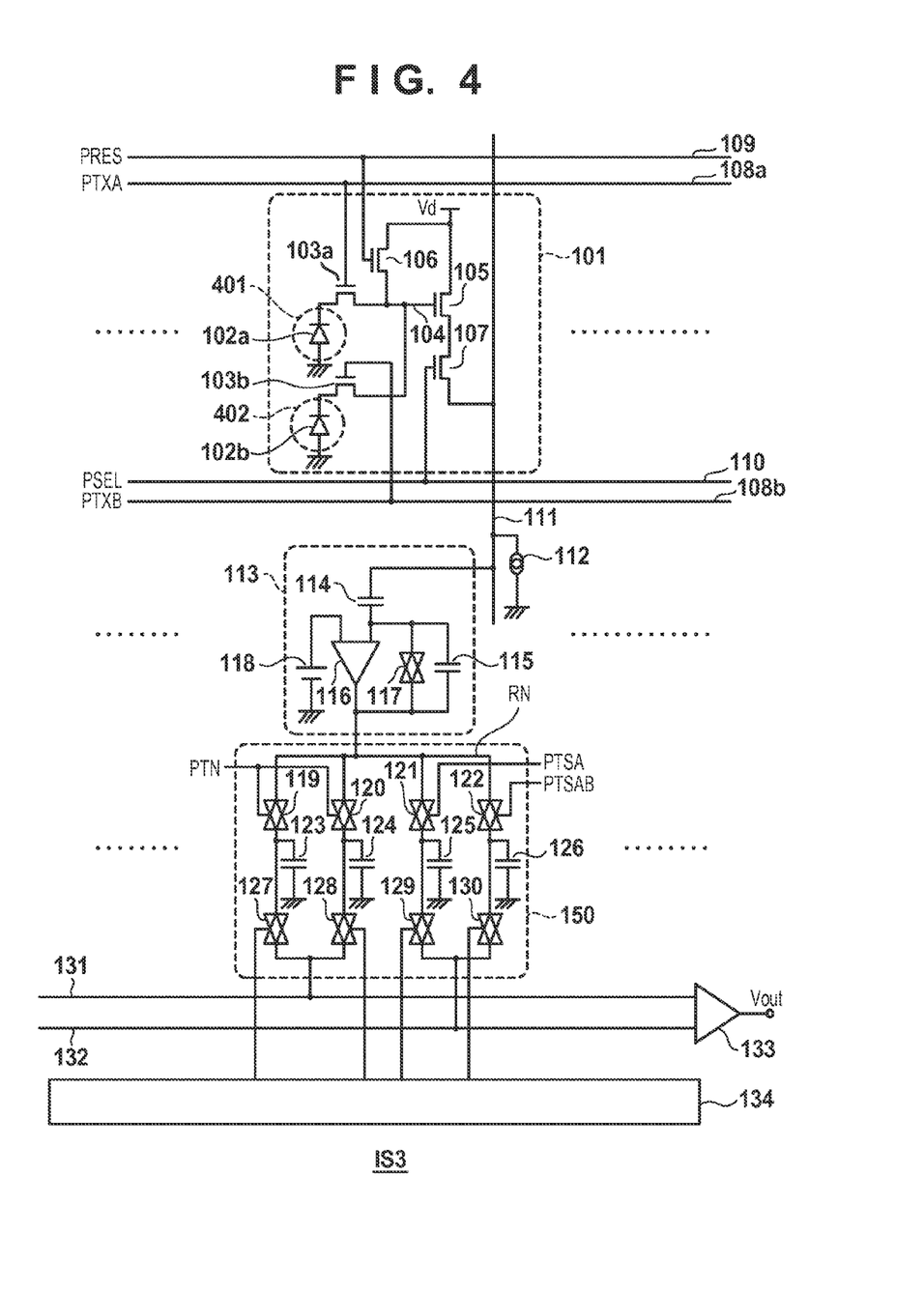
FIG. 4 is a circuit diagram showing the arrangement of a solid-state image sensor according to the third embodiment.

A solid-state image sensor IS3 according to the third embodiment will be described with reference to FIG. 4. The solid-state image sensor IS3 of the third embodiment is different from the solid-state image sensor IS1 of the first embodiment in that one microlens 401 is provided for a first photoelectric converter 102a, and one microlens 402 is provided for a second photoelectric converter 102b. That is, in the solid-state image sensor IS3 of the third embodiment, microlenses are separately provided for the first photoelectric converter 102a and the second photoelectric converter 102b. As for the remaining points, the solid-state image sensor IS3 of the third embodiment is the same as the solid-state image sensor IS1 of the first embodiment.

A solid-state image sensor IS4 according to the fourth embodiment of the present invention will be described with reference to FIGS. 5 and 6. Points not mentioned in the fourth embodiment can comply with the first embodiment. The solid-state image sensor IS4 according to the fourth embodiment explicitly shows that each pixel unit 101 can include at least three photoelectric converters. Each pixel unit 101 includes a third photoelectric converter 102c as at least one additional photoelectric converter in addition to a first photoelectric converter 102a and a second photoelectric converter 102b described above. Accordingly, the solid-state image sensor IS4 of the fourth embodiment includes a third transfer transistor 103c configured to transfer charges generated in the third photoelectric converter 102c to an input portion 104. A driving line 108c to be driven by a vertical scanning circuit (not shown) described above is connected to the gate of the third transfer transistor 103c.

In addition, switches 501, 502, 505, and 506 and memories 503 and 504 are added to a holding portion 150. The switch 501 is controlled by PTN, and the switch 502 is controlled by PTSABC. The switches 505 and 506 are controlled by a horizontal scanning circuit 134.

The operation (driving method) of the solid-state image sensor IS4 in which each pixel unit 101 includes three photoelectric converters will be described below. PTXA, PTXB, PTXC, PRES, and PSEL in FIG. 6 are signals to be applied to driving lines 108a, 108b, 108c, 109, and 110, respectively. When the signals PTXA, PTXB, PTXC, PRES, and PSEL change to high level, a first transfer transistor 103a, a second transfer transistor 103b, the third transfer transistor 103c, a reset transistor 106, and a selection transistor 107 are turned on, respectively.

Figure 6:
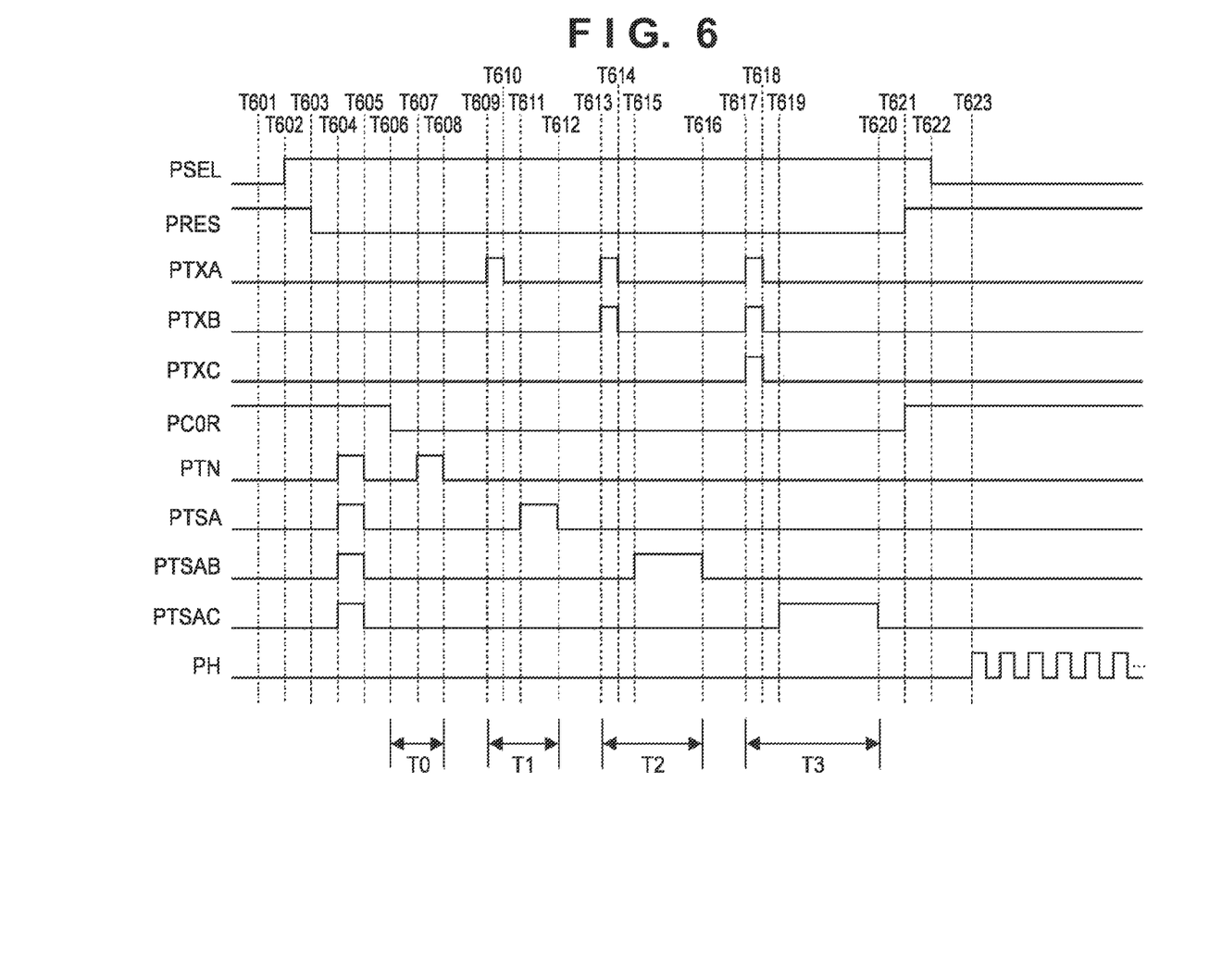
FIG. 6 is a timing chart showing the operation of the solid-state image sensor according to the fourth embodiment.

The operation from time T601 to T616 in FIG. 6 is almost the same as that from the time T201 to T216 in FIG. 2.

However, during the period from the time T604 to T605, PTXABC changes to high level in addition to PTN, PISA, and PTSAB, and the switches 501 and 502 are turned on in addition to the switches 119 to 122. Memories 123 to 126, 503, and 504 of the holding portion 150 thus hold the signal (VCOR) output from a readout portion 113 to a readout node RN.

During the period from time T617 to T618, PTXA, PTXB, and PTXC change to high level to turn on all the transistors 103a, 103b, and 103c. Hence, the charges generated in the first photoelectric converter 102a and the second photoelectric converter 102b after the time T614 and charges generated in the third photoelectric converter 102c after PTXC has finally changed from high level to low level are transferred to the input portion 104 of an amplifier 105. The amplifier 105 outputs a signal according to the change in the potential of the input portion 104 caused by the charge transfer to a column signal line 111. The readout portion 113 starts the operation of amplifying the signal output to the column signal line 111 by the gain (−C0/Cf) and outputting the signal (third optical signal) to the readout node RN. Note that the charge accumulation period of the first photoelectric converter 102a, that of the second photoelectric converter 102b, and that of the third photoelectric converter 102c may be temporally shifted from each other. In this case, during the period from the time T617 to T618, only PTXC out of PTXA, PTXB, and PTXC may be changed to high level.

During the period from time T619 to T620, PTSABC changes to high level to turn on the switch 502 of the holding portion 150. The memory 504 thus holds the signal (third optical signal) corresponding to the sum of the charges generated in the first photoelectric converter 102a, the second photoelectric converter 102b, and the third photoelectric converter 102c. FIG. 6 shows an example in which PTSABC rises at the time T619. However, PTSABC may rise at an arbitrary time during the period from the time T616 to T617.

The operation during the period from time T621 to T623 is the same as that during the period from the time T217 to T219 in FIG. 2. However, by scanning of the horizontal scanning circuit 134, the amplifier 133 amplifies and outputs the signal difference between the memories 503 and 504 in addition to the signal difference between the memories 123 and 125 and the signal difference between the memories 124 and 126.

Let T1 be the time from the start of readout of the first optical signal by the readout portion 113 to the end of capturing of the first optical signal by the holding portion 150, and T2 be the time from the start of readout of the second optical signal by the readout portion 113 to the end of capturing of the second optical signal by the holding portion 150. Also let T3 be the time from the start of readout of the third optical signal by the readout portion 113 to the end of capturing of the third optical signal by the holding portion 150. In this case, T1<T2<T3 holds preferably. The first optical signal and the second optical signal are signals as already defined above. The third optical signal is a signal corresponding to the amount of charges generated in the first photoelectric converter 102a, the second photoelectric converter 102b, and the third photoelectric converter 102c. More specifically, the third optical signal is a signal read out by the readout portion 113 to the readout node RN in a state in which the charges generated in the first photoelectric converter 102a, the second photoelectric converter 102b, and the third photoelectric converter 102c are transferred to the input portion 104. Additionally, when the noise signal is also taken into consideration, T0<T1<T2<T3 holds preferably.

In the example shown in FIG. 6, the charge transfer for the photoelectric converters to the input portion 104 is performed three times. However, the number of times may be two. For example, the times T613 to T616 may be omitted. In this case, when scanning of the horizontal scanning circuit 134, signal transfer from the memories 124 and 126 to the horizontal signal lines 131 and 132 is not performed.

Figure 5:
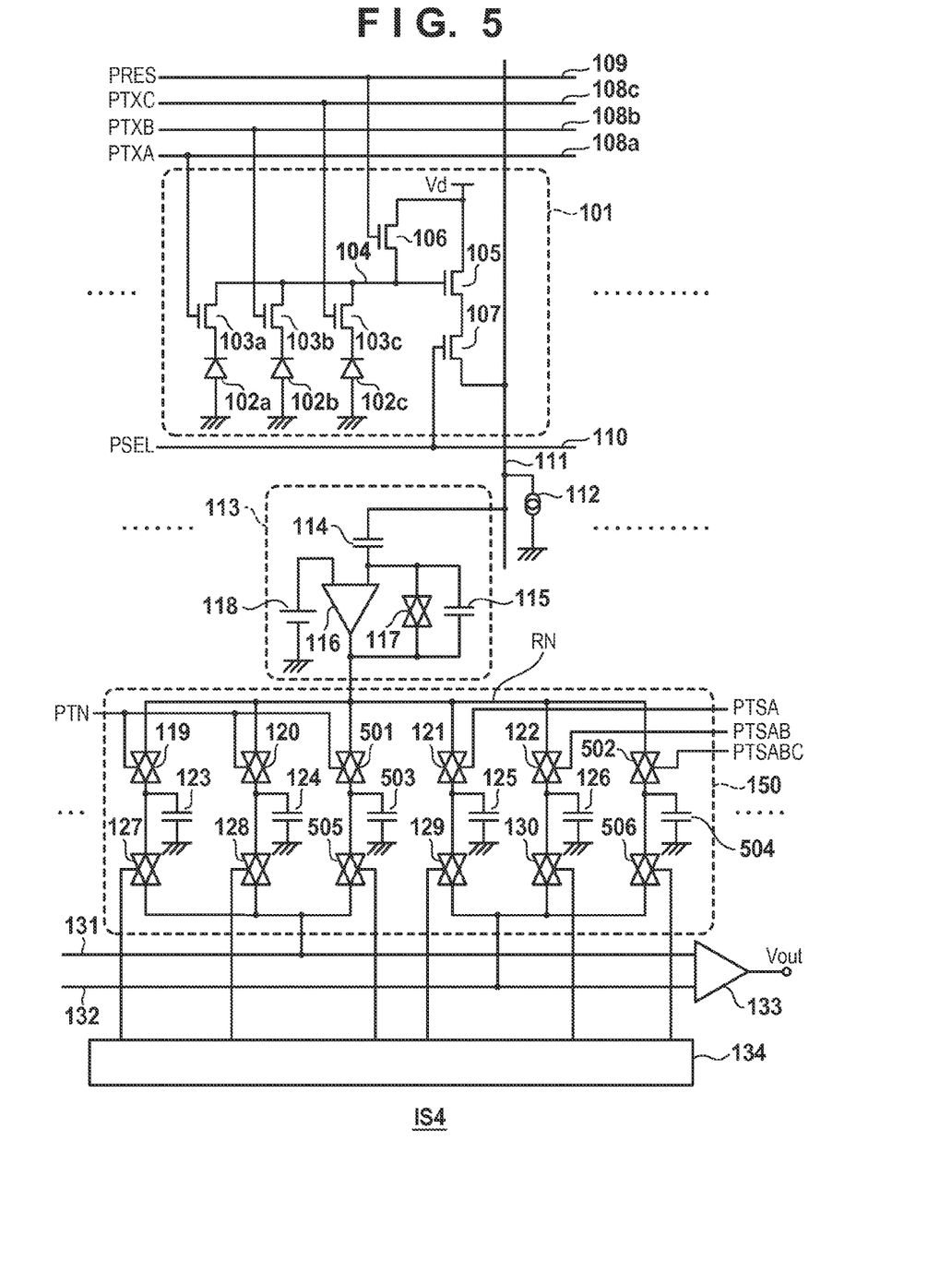
FIG. 5 is a circuit diagram showing the arrangement of a solid-state image sensor according to the fourth embodiment.

FIG. 5 illustrates an example in which one amplifier is provided for three photoelectric converters. However, one amplifier may be provided for four or more photoelectric converters. The plurality of photoelectric converters sharing the amplifier can be arranged either under the common microlens or under different microlenses.

As an application example of the solid-state image sensor according to each of the above-described embodiments, a camera incorporating the solid-state image sensor will be exemplified. The concept of the camera includes not only apparatuses mainly aiming at photographing but also apparatuses secondarily having a photographing function (for example, a personal computer and a portable terminal). The camera includes the solid-state image sensor according to the present invention exemplified in the above-described embodiments, and a processor that processes a signal output from the solid-state image sensor. The processor can include, for example, an A/D converter, and a processor that processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-170379, filed Jul. 31, 2012, which is hereby incorporated by reference herein in its entirety.

What is claimed is:

1. A solid-state image sensor comprising a pixel unit, a readout portion configured to read out signals from the pixel unit via a column signal line, and a holding portion configured to capture the signals read out by the readout portion, the pixel unit including a first photoelectric converter configured to generate first charges, a second photoelectric converter configured to generate second charges, an amplifier including an input portion and provided commonly for the first photoelectric converter and the second photoelectric converter to output signals to the column signal line, a first transfer transistor configured to transfer the first charges to the input portion, and a second transfer transistor configured to transfer the second charges to the input portion, wherein the signals which are read out by the readout portion includes a first optical signal which is read out in a state in which the first charges are transferred from the first photoelectric converter to the input portion by the first transfer transistor, and a second optical signal which is read out, after the readout of the first optical signal, in a state in which the second charges are transferred, by the second transfer transistor, from the second photoelectric converter to the input portion which holds the first charges having been transferred from the first photoelectric converter, and letting T1 be a time from a start of readout of the first optical signal by the readout portion to an end of capturing of the first optical signal by the holding portion, and T2 be a time from a start of readout of the second optical signal by the readout portion to an end of capturing of the second optical signal by the holding portion, T1<T2 holds.

2. The sensor according to claim 1, wherein the pixel unit further comprises a reset transistor configured to reset a potential of the input portion, the signals read out by the readout portion includes a noise signal read out in a state in which a voltage of the input portion is reset by the reset transistor, and letting T0 be a time from a start of readout of the noise signal by the readout portion to an end of capturing of the noise signal by the holding portion, T0<T1<T2 holds.

3. The sensor according to claim 2, wherein the readout portion comprises:

a differential amplifier including a first input terminal, a second input terminal, and an output terminal;

a clamp capacitor arranged between the input portion and the first input terminal;

a feedback capacitor arranged between the first input terminal and the output terminal; and a switch arranged between the first input terminal and the output terminal, the second input terminal being given a reference voltage, and the holding portion comprises a memory, causes the memory to hold signals read out by the readout portion in a state in which reset of the voltage of the input portion by the reset transistor is stopped, and the switch is turned on, and then causes the memory to hold the noise signal.

4. The sensor according to claim 2, wherein the holding portion comprises two memories configured to hold the noise signal, a memory configured to hold the first optical signal, and a memory configured to hold the second optical signal.

5. The sensor according to claim 1, wherein when the second transfer transistor transfers the second charges from the second photoelectric converter to the input portion, the first transfer transistor transfers charges from the first photoelectric converter to the input portion again.

6. The sensor according to claim 1, wherein a common microlens is provided for the first photoelectric converter and the second photoelectric converter.

7. The sensor according to claim 1, wherein separate microlenses are provided for the first photoelectric converter and the second photoelectric converter, respectively.

8. The sensor according to claim 1, further comprising:
a second pixel unit;
a second readout portion configured to read out signals from the second pixel unit via a second column signal line; and
a second holding portion configured to capture the signals read out by the second readout portion,
the second pixel unit comprising:
a third photoelectric converter;
a fourth photoelectric converter;
a second amplifier provided commonly for the third photoelectric converter and the fourth photoelectric converter to output a signal to the second column signal line;
a third transfer transistor configured to transfer charges generated in the third photoelectric converter to a second input portion serving as the input portion of the second amplifier; and
a fourth transfer transistor configured to transfer charges generated in the fourth photoelectric converter to the second input portion, wherein a common microlens is provided for the first photoelectric converter and the third photoelectric converter, and a common microlens is provided for the second photoelectric converter and the fourth photoelectric converter.

9. The sensor according to claim 1, wherein the pixel unit comprises at least one additional photoelectric converter, and
the amplifier is provided commonly for the first photoelectric converter, the second photoelectric converter, and the at least one additional photoelectric converter.

10. A camera comprising:
a solid-state image sensor of claim 1; and
a processor configured to process a signal output from the solid-state image sensor.

11. A method of driving a solid-state image sensor including a pixel unit, a readout portion configured to read out signals from the pixel unit via a column signal line, and a holding portion configured to capture the signals read out by the readout portion, the pixel unit including a first photoelectric converter configured to generate first charges, a second photoelectric converter configured to generate second charges, an amplifier including an input portion and provided commonly for the first photoelectric converter and the second photoelectric converter to output signals to the column signal line, a first transfer transistor configured to transfer the first charges to the input portion, and a second transfer transistor configured to transfer the second charges to the input portion, the signals read out by the readout portion including a first optical signal read out in a state in which first charges are transferred from the first photoelectric converter to the input portion by the first transfer transistor, and a second optical signal read out, after the readout of the first optical signal, in a state in which the second charges are transferred, by the second transfer transistor, from the second photoelectric converter to the input portion which holds the first charges having been transferred from the first photoelectric converter, the method comprising:

driving the solid-state image sensor such that letting T1 be a time from a start of readout of the first optical signal by the readout portion to an end of capturing of the first optical signal by the holding portion, and T2 be a time from a start of readout of the second optical signal by the readout portion to an end of capturing of the second optical signal by the holding portion, T1<T2 holds.

12. The sensor according to claim 1, wherein the second optical signal is a signal which is read out in a state in which charges are newly transferred from the first photoelectric converter to the input portion by the first transfer transistor, and the second charges are transferred, by the second transfer transistor, from the second photoelectric converter to the input portion, in addition to the first charges having been transferred from the first photoelectric converter.

13. The method according to claim 11, wherein the second optical signal is a signal which is read out in a state in which charges are newly transferred from the first photoelectric converter to the input portion by the first transfer transistor, and the second charges are transferred, by the second transfer transistor, from the second photoelectric converter to the input portion, in addition to the first charges having been transferred from the first photoelectric converter.

* * * * *